(12) United States Patent
Bolt

(10) Patent No.: US 7,349,930 B2
(45) Date of Patent: Mar. 25, 2008

(54) EMULATED BACKUP TAPE DRIVE USING DATA COMPRESSION

(75) Inventor: Thomas B. Bolt, Encinitas, CA (US)

(73) Assignee: Quantum Corporation, San Jose, CA (US)

( * ) Notice: Subject to any disclaimer, the term of this patent is extended or adjusted under 35 U.S.C. 154(b) by 557 days.

(21) Appl. No.: 10/072,437

(22) Filed: Feb. 5, 2002

(65) Prior Publication Data

US 2003/0149700 A1    Aug. 7, 2003

(51) Int. Cl.
*G06F 17/30* (2006.01)
(52) U.S. Cl. .................................. 707/204; 707/205
(58) Field of Classification Search ............. 707/1–10, 707/100–104.1, 200–206
See application file for complete search history.

(56) References Cited

U.S. PATENT DOCUMENTS

| 5,649,196 | A | * | 7/1997 | Woodhill et al. | ............ | 707/204 |
| 5,956,733 | A | * | 9/1999 | Nakano et al. | ............ | 707/204 |
| 6,330,570 | B1 | * | 12/2001 | Crighton | ............ | 707/204 |
| 6,341,329 | B1 | | 1/2002 | LeCrone et al. | | |
| 6,378,054 | B1 | * | 4/2002 | Karasudani et al. | ........ | 707/204 |
| 6,718,466 | B1 | * | 4/2004 | Duwe et al. | ............ | 713/100 |
| 6,886,020 | B1 | * | 4/2005 | Zahavi et al. | ............ | 707/204 |

FOREIGN PATENT DOCUMENTS

| EP | 0869439 | 10/1998 |
| EP | 1164491 | 12/2001 |
| WO | WO 99/12098 | 3/1999 |

OTHER PUBLICATIONS

Pages from ATTO Technology, Inc. Website www.attotech.com downloaded on Aug. 29, 2002 author unknown.
Pages from Medea Corporation Website www.medea.com downloaded on Aug. 29, 2002 author unknown.
Pages from N Stor Technologies Website www.nstor.com downloaded on Aug. 29, 2002 author unknown.
Pages from Raidtec Corporation Website www.raidtec.com downloaded on Aug. 29, 2002 author unknown.
Pages from Chaparral Network Storage Website www.chaparralnet.com downloaded on Aug. 29, 2002 author unknown.
European Search Report for European patent application No. EP 03250749 filed on Feb. 5, 2003, 3 pages.

* cited by examiner

*Primary Examiner*—Isaac Woo
(74) *Attorney, Agent, or Firm*—James P. Broder; Steven G. Roeder

(57) ABSTRACT

A back up storage device (20) that backs up non-compressed data during a backup window period and then later after the backup window period is over and the device (20) is idle, it retrieves, compresses and then re-stores the data to reclaim space on the storage medium of the device (20). During operation, a duty cycle having a backup window period and an idle period is defined. When the back up window starts, data is down-loaded and stored on the device (20) in non-compressed form. When the idle period begins, the non-compressed data is retrieved, compressed and then re-stored on the device (20) to reclaim space on the storage medium of the device (20). In one embodiment of the invention, the back up storage device (20) is an emulated tape drive (20) that uses a software compression algorithm to compress the data stored in the device (20).

36 Claims, 6 Drawing Sheets

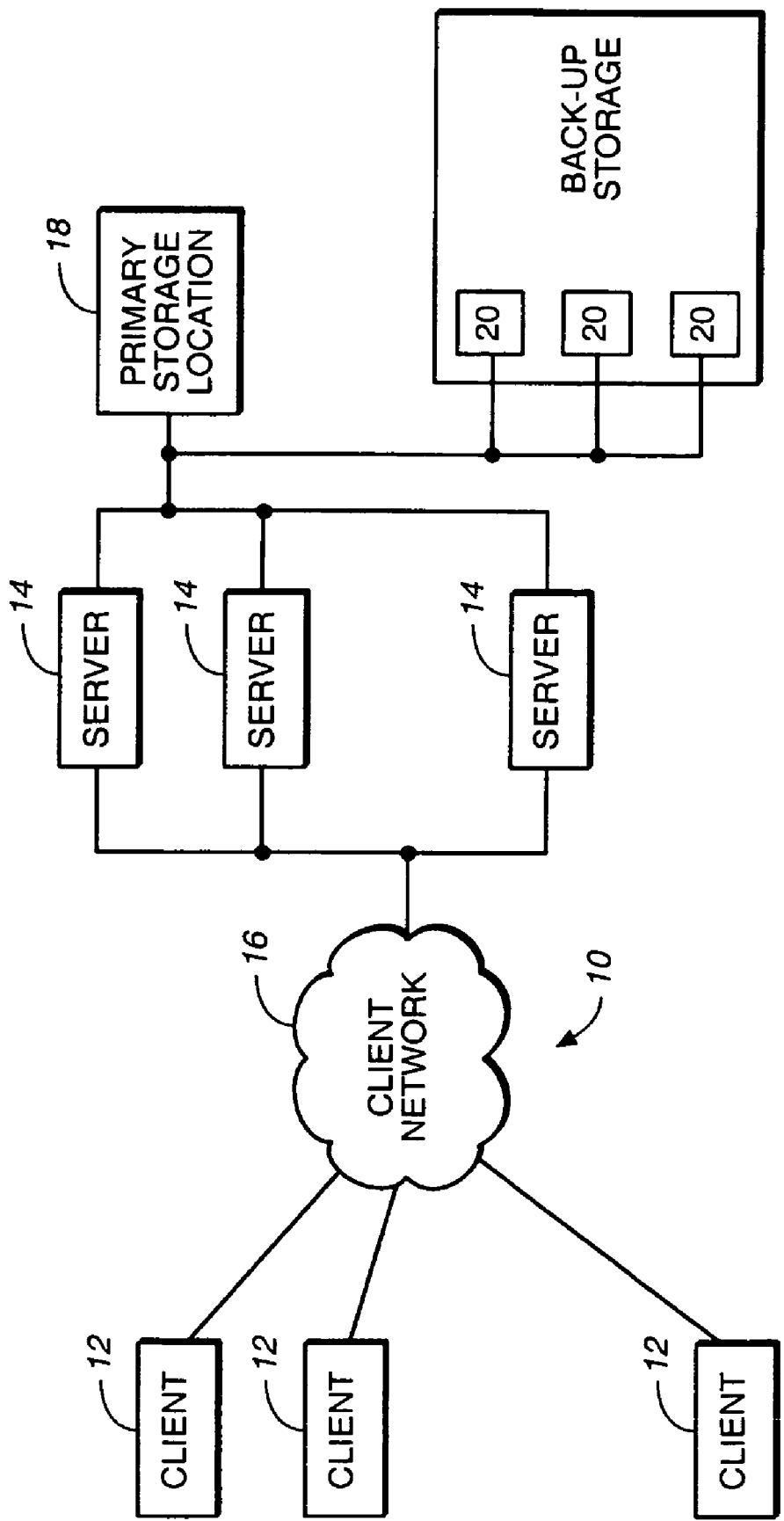
FIG._1

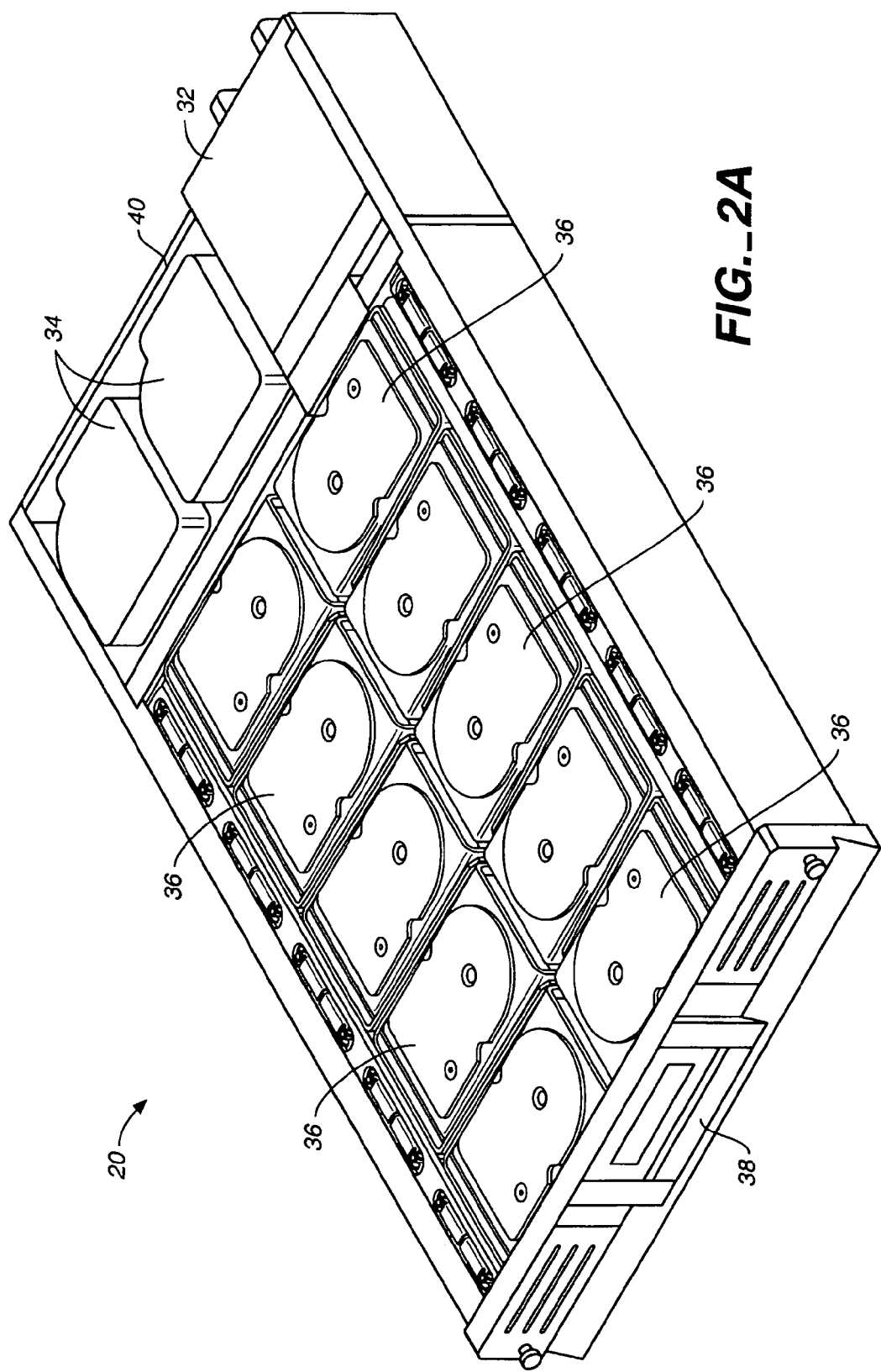
FIG._2A

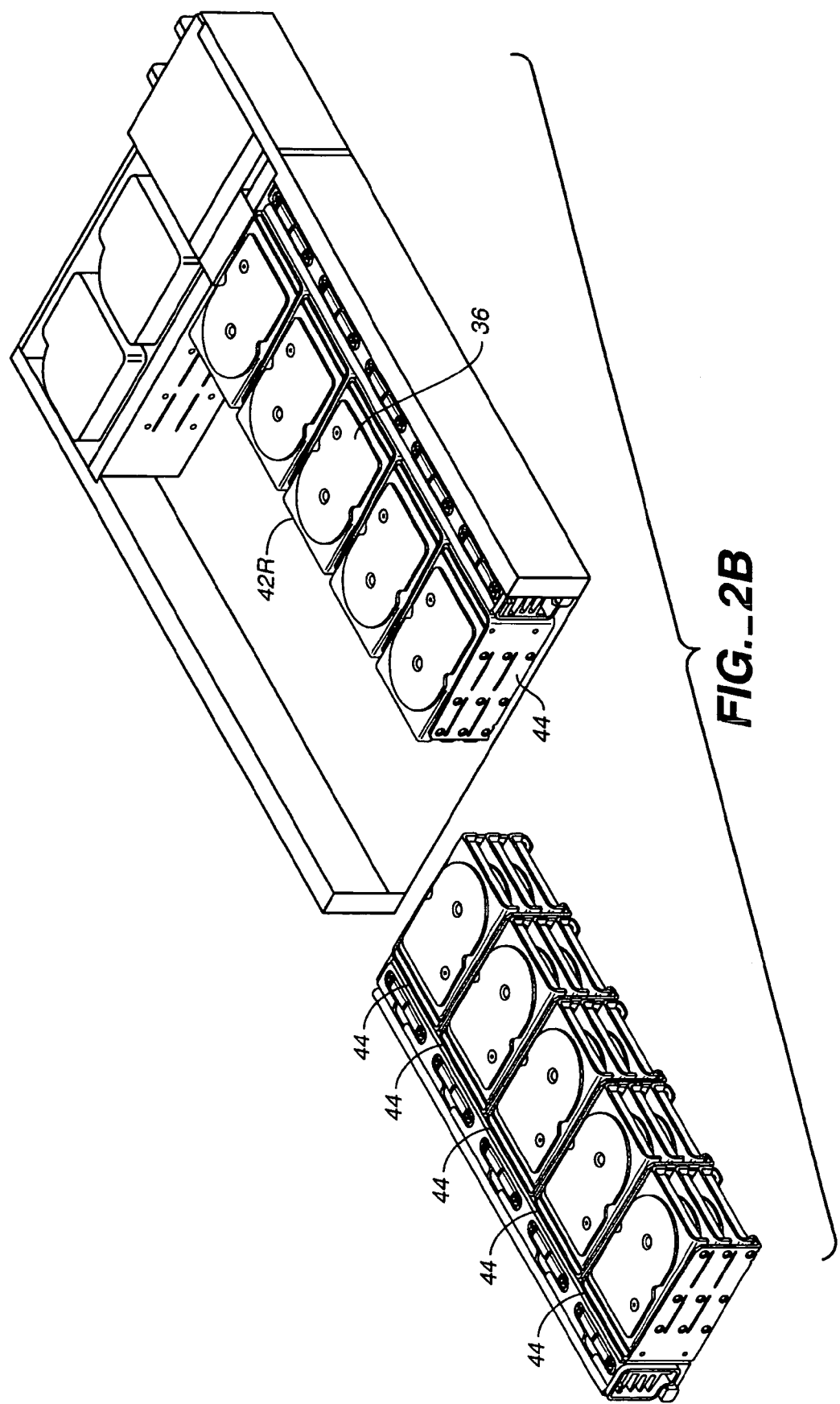
FIG._2B

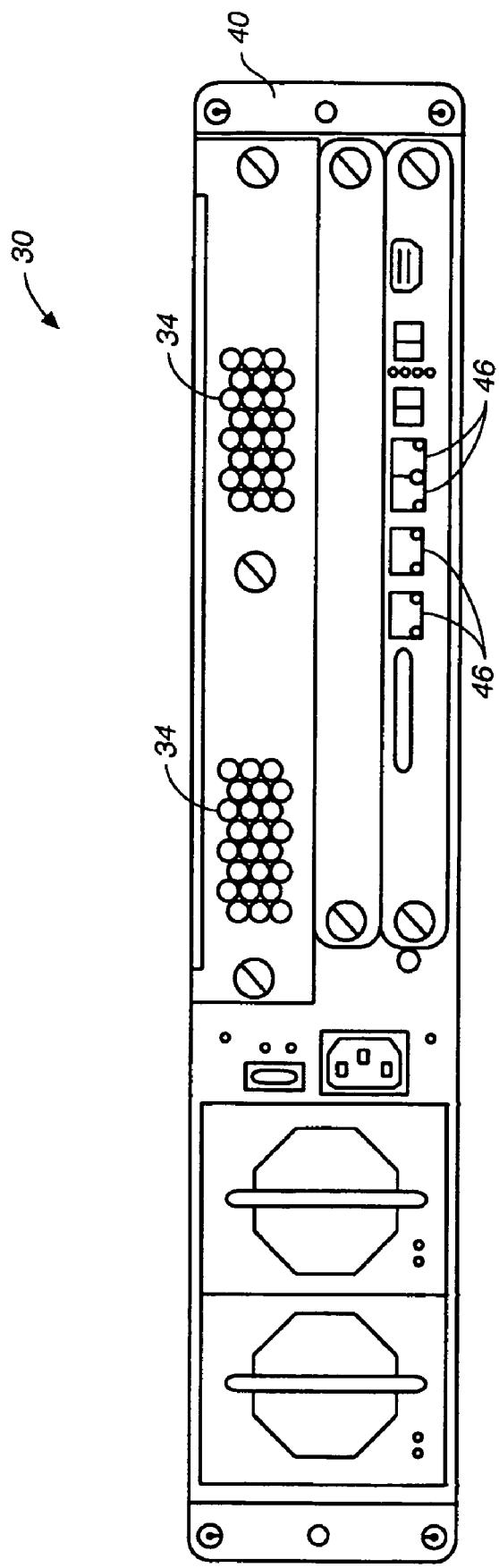
FIG._2C

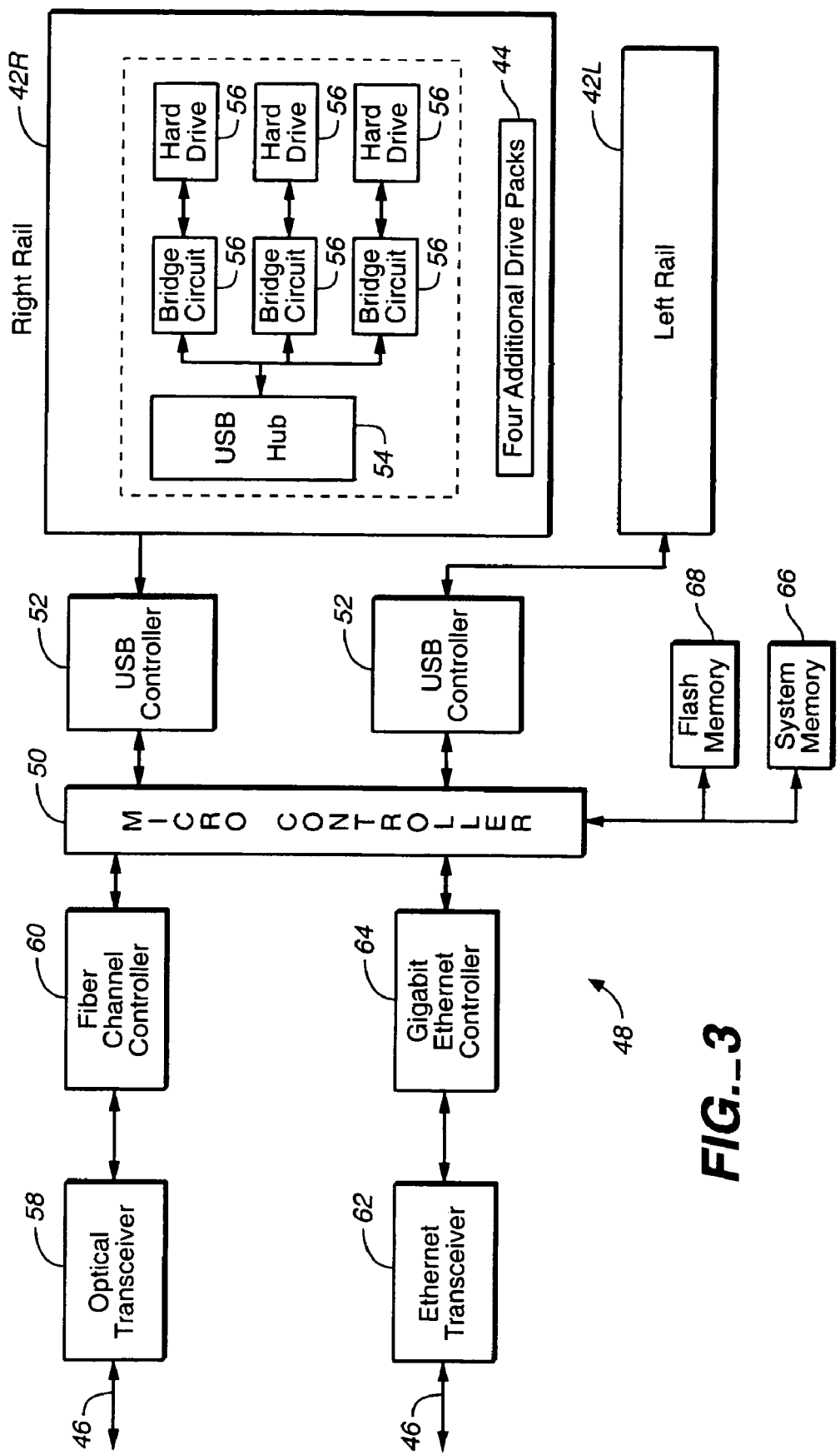
FIG._3

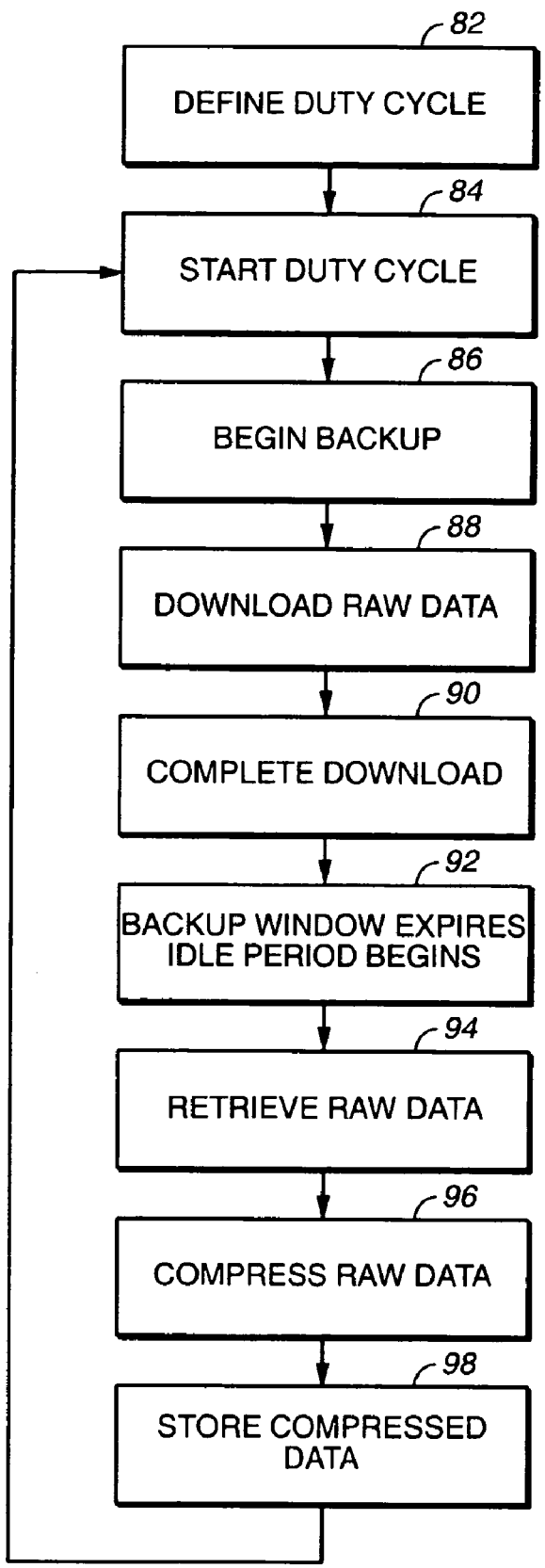
FIG._4

EMULATED BACKUP TAPE DRIVE USING DATA COMPRESSION

FIELD OF THE INVENTION

The present invention relates generally to back up data storage, and more specifically, to an emulated backup tape drive that stores non-compressed data during backup operations and then afterwards when the drive is idle, retrieves, compresses and then re-stores the data to reclaim space on the storage medium of the drive.

BACKGROUND

With the increasing popularity of Internet commerce and network centric computing, businesses and other entities are becoming more and more reliant on information. Protecting critical data from loss due to system crashes, virus attacks and the like is therefore of primary importance. A well designed data protection program will generally have the ability to (i) instantly re-store data in the event of a disaster to enabled continued computing operations; (ii) re-store data over an extended period of time (hours or days) without disrupting normal computing operations; and (iii) archive copies of data that are retrieved infrequently and with little urgency. Tape drives have long been a choice for storing archival back up data in information systems.

Historically many such tape drives have used data compression to maximize the amount of data that can be stored on the tape. Tape, however, is a relatively slow and inefficient storage medium. Consequently emulated "tape" drives that use arrays of hard drives have become more popular recently. These emulated tape drives often rely on data compression to enable the storage of more data. The problem with current emulated tape drives is that the data compression is performed "on the fly" during the backup. In other words, compression occurs in the critical path of the down loading of data, thereby impeding performance. The designers of emulated tape drive systems have therefore relied on expensive, high speed, hardware data compression solutions to achieve an acceptable level of performance. The use of slower, less expensive software compression algorithms have not been a viable option in the past because of a lack of acceptable performance.

An emulated backup tape drive that stores non-compressed data during backup operations and then afterwards when the drive is idle, retrieves, compresses and then re-stores the data to reclaim space on the storage medium of the drive is therefore needed.

SUMMARY

To achieve the foregoing, and in accordance with the purpose of the present invention, a back up storage device is disclosed that stores non-compressed data during backup operations and then afterwards when the device is idle, retrieves, compresses and re-stores the data to reclaim space on the storage medium of the device. During operation, a duty cycle having a backup window period and an idle period is defined. When back ups occur during the window, data is down-loaded and stored on the device in non-compressed form. Later during the idle period of the duty cycle, the non-compressed data is retrieved, compressed and re-stored to reclaim space on the storage medium of the device. Since the compression occurs when the back up device is idle, the rate at which data is backed up is not adversely effected in any way. Thus a low cost software data compression algorithm may be used. In one embodiment of the invention, the back up storage device is an emulated tape drive that uses an array of hard drives for the storage medium. In other embodiments, any type of storage medium can be used such as tape or semiconductor memory chips for example.

BRIEF DESCRIPTION OF THE DRAWINGS

The invention, together with further advantages thereof, may best be understood by reference to the following description taken in conjunction with the accompanying dnon-compressedings in which:

FIG. 1 is block diagram of an exemplary information infrastructure in which the emulated backup tape drive of the present invention may be used.

FIGS. 2A, 2B and 2C are diagrams of the emulated tape drive of the present invention.

FIG. 3 is block diagram of a controller of the emulated tape drive of the present invention.

FIG. 4 is flow diagram illustrating a backup and compression duty cycle of the emulated tape drive of the present invention.

DESCRIPTION

Referring to FIG. 1, a block diagram of an exemplary information infrastructure in which the emulated backup tape drive of the present invention may be used is shown. The information infrastructure 10 includes a plurality of clients 12 and a plurality of servers 14 coupled together by a client network 16, a primary storage location 18, and one or more emulated tape drives 20 coupled together by a network connection 22. The clients 12 can be any type of client such as but not limited to a personal computer, a "thin" client, a personal digital assistant, a web enabled appliance or a cell phone. The servers 14 may also be of any variety such as those based on the Unix, Linux, or the Microsoft Windows operating systems or a combination thereof. Likewise, the client network 16 can be any type of network including but not limited to the Internet, a corporate intranet, a wide area network, a local area network, a wireless network, or any combination thereof. The primary storage location 18 can be arranged in a number of different types of configurations, such as a storage array network (SAN), or network attached storage (NAS), or direct attached storage . In other embodiments, the primary storage location 18 can reside in the chassis/cabinet of the servers 14, stand alone storage devices, or a combination thereof. The connection 22 can be either direct (such as parallel SCSI or IDE) or a network topology such as fibre channel, Ethernet (fast, gigabit, or 10 gigabit) for example. Also when multiple emulated tape devices 20 are used, they may be daisy-chained together to provide more backup capacity.

Referring to FIG. 2A, a perspective view of an emulated tape drive 20 is shown. The emulated tape drive 20 includes a chassis 30, a power supply 32, a pair of fans 34, and an array of hard drives 36, all housed in the chassis 30. A user interface panel 38 is located at the front of the chassis 30. A back plate 40 is provided at the rear portion of the chassis 30.

Referring to FIG. 2B, an exploded perspective view of the hard drives 36 according to one embodiment of the present invention is shown. In this embodiment, the hard drives 36 are configured in a pair of left and right rails (42L and 42R) respectively. Within each rail 42, five (5) columns of three (3) hard drives 36 are arranged in disk packs 44 respectively. It should be noted that this embodiment is only exemplary.

According to various other embodiments of the present invention, the number of hard drives 36 may be arranged in any number of rails 42 (rows) and the number of hard drives 36 (columns) per disk pack 44 may vary.

Referring to FIG. 2C, a view of the back plate 40 of the chassis 30 is shown. The back plate 40 includes vents for the fans 34 and a number of input/output ports 46. The input/output ports 46 are provided to connect a controller 48 (not visible because it is internal to the chassis 30) to the primary storage location 18 through the network connection 22. For more details on the features and operation of the emulated tape drive 20, see co-pending US application entitled "Storage System Utilizing An Active Subset of Drives During Data Storage And Retrieval Operations" by Thomas B. Bolt and Kevin C. Daly, U.S. Patent Publication No. US 2003-0149840 A1, filed concurrently herewith incorporated herein by reference for all purposes.

Referring to FIG. 3, a block diagram of one embodiment of the controller 48 configured for the emulated tape drive 20 illustrated in FIGS. 2A-2C is shown. With this embodiment, the controller 48 includes a micro-controller 50, such as a microprocessor, configured to communicate with the hard drives 36 of the disk packs 44 through a USB controller 52, a USB hub 54 and bridge circuit 56. For the sake of simplicity, these components are shown for only one disk pack 44. The remaining four disk packs 44 of the right rail 42R and all of the disk packs 44 of the left rail 42L communicate with the micro-controller 50 in a similar arrangement. In situations where the network connection 22 is fiber channel, the micro-controller 50 is connected to the primary storage location 18 through an optical transceiver 58 and a fiber channel controller 60. Alternatively, when the network connection 22 is a Giga-bit Fast ethernet connection, the micro-controller 50 is connected to the primary storage location 18 through an ethernet transceiver 62 and an ethernet controller 64. It should be pointed out that these two connections are merely illustrative. In various embodiments of the present invention, multiple fiber channel ports and/or multiple ethernet channel ports, either alone or in any combination, can be provided. Alternate interfaces such as parallel SCSI (Small Computer System Interface) may also be substituted or used in conjunction with fire channel of Ethernet. Additionally, alternate internal interconnect technologies such as fibre channel or parallel SCSI could be used instead of USB.

A system memory 66 and a non-volatile memory 68 are also coupled to the micro-controller 50. In one embodiment of the invention, the system memory 66 is RAM and the non-volatile memory is Flash. The non-volatile memory is used for storing the micro-code used to program the micro-controller 50 as well as the compression/decompression software algorithms which are used by the emulated tape drive 22. It again should be noted that the circuit components of this diagram are merely illustrative of one embodiment of the present invention. Other embodiments would be readily apparent to those skilled in the art. For example, in embodiments with either more or fewer rails 42 and disk packs 44, additional or fewer USB controllers 52 and USB hubs 54 would be required. Also the interface hardware between the input/output ports 44 would be different if other type of networking protocols besides fiber channel or ethernet were used.

Referring to FIG. 4, a flow diagram 80 illustrating the operation of the emulated tape drive 20 is shown. Initially a system administrator or user of the information infrastructure 10 defines a duty cycle (step 82) for the emulated tape drive 20. The duty cycle includes a backup window period and an idle period. Usually the backup window period is scheduled at a set time each day or at some other fixed time interval when the emulated tape drive 20 is at its lowest utilization. When backups are not occurring, the emulated tape drive 20 is idle.

According to one embodiment, when the duty cycle starts (step 84), the backup of data begins (step 86). The data is downloaded from the primary storage location 18 through the input/output ports 44, the micro-controller 50, the appropriate USB controller 52, USB hub 54, and bridge circuit 56 and stored (step 88) in non-compressed form on one of the hard drives 36. When the backup window period expires, the idle period begins (step 92). During the idle period, the non-compressed data stored on the hard drives 36 is retrieved (step 94) and provided to the micro-controller 50 through the bridge circuit 56, USB hub 54, and USB controller 52. The micro-controller 50 compresses the data (step 96) and then re-stores it on the hard drives 36 (step 98) to reclaim space on the hard drives 36. When the idle period is over and next backup window begins, a new duty cycle begins (step 84) and the aforementioned steps are repeated. In various embodiments, any one of a variety of software compression algorithms may be used, such as a zip; a gnuzip; a bzip; a b2zip; a Lempil Ziv; and a LZS (Lempil Ziv Stac). Alternately, other compression algorithms can be used.

When compressed data on the emulated tape drive 20 is needed, it is retrieved and provided to the micro-controller 50. The data is decompressed using the software algorithms stored in the Flash memory 68 and provided to the primary storage location 18 through appropriate input/output port 44. Since compression algorithms are typically asymmetric, data decompression is not nearly as computationally intensive as compression, and the performance of the emulated tape drive 20 during data retrieval is not significantly degraded using a software solution.

The present invention thus provides an emulated tape device used for the backup of archival data that uses a software based data compression algorithm. Since the compression occurs when the emulated tape drive 20 is idle, the rate at which data is stored during a backup operation is not adversely effected in any way.

It should be noted that the duty cycle could occur any time there is a detection of inactivity on the primary data interface 46. After some time period of inactivity (for example, 20 minutes), the system could begin retrieving and compressing data. This process can be interrupted at any point if activity is detected on the primary data interface 46. It is acceptable for data to be partially compressed, and it is possible to restart the compression from the point at which it was previously suspended.

Although the foregoing invention has been described in some detail for purposes of clarity of understanding, it will be apparent that certain changes and modifications may be practiced within the scope of the appended claims. For instance, the present invention can be ready practice with any type of read-write storage medium such as magnetic tape, silicon memory chips, devices such as SRAM, DRAM, Flash, EPROM, EUVPROM, EEPROM, etc. The described embodiments should therefore be taken as illustrative and not restrictive, and the invention should not be limited to the details given herein but should be defined by the following claims and their full scope of equivalents.

What is claimed is:

1. A storage system comprising:
a primary storage location including an input/output port;
a backup storage device; and a controller that transmits data between the primary storage location and the backup storage device according to a duty cycle having a predetermined backup window period when uncompressed data from the primary storage location is copied to the backup storage device, and an idle period when uncompressed data from the primary storage location is not being copied in uncompressed form to the backup storage device;

wherein during the idle period the controller retrieves the uncompressed data stored on the backup storage device, compresses the retrieved data, and then re-stores the compressed data on the backup storage device.

2. The storage system of claim 1, wherein the compression of data is performed using a software data compression algorithm.

3. The storage system of claim 1, wherein the backup storage device is an emulated tape drive containing an array of hard drives.

4. A storage system comprising:
a primary storage location including an input/output port;
a backup storage device; and
a controller that copies uncompressed data from the primary storage location to the backup storage device during a predetermined backup period, and retrieves the uncompressed data from the backup storage device, compresses the retrieved data, and then re-stores the compressed data on the backup storage device during an idle period that begins following a predetermined time period of inactivity through the input/output port.

5. The storage system of claim 4, wherein the controller is further configured to execute a software algorithm to compress the retrieved data.

6. The storage system of claim 5, wherein the software algorithm includes one of the following types of algorithms a zip; a gnuzip; a bzip; a b2zip; a Lempil Ziv; and a LZS (Lempil Ziv Stac).

7. The storage system of claim 5, wherein the software algorithm is stored in a memory associated with the controller.

8. The storage system of claim 4, further comprising a fiber channel controller coupled between the controller and the input/output port which comprises an optical transceiver.

9. The storage system of claim 4, further comprising an ethernet controller coupled between the controller and the input/output port which comprises an ethernet transceiver.

10. The storage system of claim 4, further comprising a network hub and bridge circuit coupled between the backup storage device and the controller.

11. The storage system of claim 4, further comprising:
a primary storage location that allows transmission of uncompressed data from the primary storage location to the backup storage device.

12. The storage system of claim 11, wherein the network connection is one of the following types of network connections: fiber channel or ethernet.

13. The storage system of claim 11, wherein the primary storage location and the backup storage device are arranged in one of the following: a storage attached network or network attached storage configuration.

14. The storage system of claim 11, further comprising a plurality of clients and servers coupled to the primary storage location through a client network.

15. A computer-implemented method for storing data from a primary storage location having an input/output port onto a backup storage device, the method comprising the steps of:

copying uncompressed data during a predetermined backup window period from the primary storage location to the backup storage device;
compressing the data with a controller during an idle period defined by when uncompressed data is not being copied from the primary storage location to the backup storage device; and
re-storing the compressed data onto the backup storage device during the idle period.

16. The method of claim 15, wherein the compression of data is performed using a software data compression algorithm.

17. The method of claim 16, wherein the software data compression algorithm includes one of the following types of algorithms: a zip; a gnuzip; a bzip; a b2zip; a Lempil Ziv; and a LZS (Lempil Ziv Stac).

18. The method of claim 15, further comprising successively repeating the receiving and storing of data during the backup window periods and retrieving, compressing and storing compressed data on the backup storage device during successive duty cycles respectively.

19. The method of claim 15, wherein the backup storage device is an emulated tape drive containing an array of hard drives.

20. The method of claim 15, wherein the data is downloaded over a network from a primary storage location.

21. The method of claim 20, wherein the data is downloaded over a fiber-channel connection between the primary storage location and the backup storage device.

22. The method of claim 20, wherein the data is downloaded over an ethernet connection between the primary storage location and the backup storage device.

23. The method of claim 20, wherein the primary storage location and the backup storage device are part of a storage array network.

24. The method of claim 20, wherein the primary storage location and the backup storage device are part of a network attached storage configuration.

25. The method of claim 15, wherein the backup storage device is directly electrically connected to a server.

26. The method of claim 15 wherein the step of compressing the data includes beginning the idle period following a predetermined time period of inactivity through the input/output port.

27. The method of claim 15 further comprising the step of interrupting the step of compressing the data when activity is detected through the input/output port.

28. The method of claim 15 further comprising the step of interrupting the step of re-storing the compressed data when activity is detected through the input/output port.

29. A computer-implemented method for storing data from a primary storage location having an input/output port onto a backup storage device, the method comprising the steps of:

copying uncompressed data from the primary storage location through the input/output port to the backup storage device;
compressing the data copied to the backup storage device with a controller during an idle period that begins following a predetermined time period of inactivity through the input/output port; and
re-storing the compressed data onto the backup storage device with the controller during the idle period.

30. The method of claim 29, wherein the compression of data is performed using a software data compression algorithm.

31. The method of claim 29, further comprising successively repeating the receiving and storing of data during the backup window periods and retrieving, compressing and storing compressed data on the backup storage device during successive duty cycles respectively.

32. The method of claim 29, wherein the backup storage device is an emulated tape drive containing an array of hard drives.

33. The method of claim 29, wherein the data is downloaded over a network from a primary storage location.

34. The method of claim 29 further comprising the step of interrupting the step of compressing the data when activity is detected through the input/output port.

35. The method of claim 29 further comprising the step of interrupting the step of re-storing the compressed data when activity is detected through the input/output port.

36. A storage system comprising:

a primary storage location including an input/output port;

a backup storage device; and a controller that transmits data between the primary storage location and the backup storage device according to a duty cycle having a backup window period and an idle period, the controller transmitting uncompressed data from the primary storage location for copying to the backup storage device during the backup window period, the controller determining initiation of the idle period based on a predetermined time period of inactivity of data transmission through the input/output port and terminating the idle period once data transmission through the input/output port occurs;

wherein during the idle period, the controller initiates (i) compression of uncompressed data stored on the backup storage device, and (ii) restorage of compressed data onto the backup storage device.

* * * * *